(12) United States Patent
Yanagita

(10) Patent No.: US 11,911,900 B2
(45) Date of Patent: Feb. 27, 2024

(54) ROBOT CONTROLLER AND ROBOT CONTROL METHOD

(71) Applicant: FANUC CORPORATION, Yamanashi (JP)

(72) Inventor: Akihiro Yanagita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 194 days.

(21) Appl. No.: 17/090,195

(22) Filed: Nov. 5, 2020

(65) Prior Publication Data

US 2021/0146530 A1    May 20, 2021

(30) Foreign Application Priority Data

Nov. 20, 2019    (JP) ................. 2019-209375

(51) Int. Cl.
   *B25J 9/16*    (2006.01)
   *G05B 19/4155*    (2006.01)
   *B25J 11/00*    (2006.01)

(52) U.S. Cl.
   CPC .......... *B25J 9/1602* (2013.01); *B25J 11/005* (2013.01); *G05B 19/4155* (2013.01); *G05B 2219/31076* (2013.01)

(58) Field of Classification Search
   CPC ... B25J 11/00; B25J 11/005; B25J 9/00; B25J 9/16; B25J 9/1602; B25J 9/1605; B25J 9/1607; B25J 9/161; B25J 9/0081; B25J 9/1656; B25J 9/1664; B25J 9/1661; B25J 9/1679; G05B 19/00; G05B 19/02; G05B 19/18; G05B 19/4155; G05B 2219/00; G05B 2219/30; G05B 2219/31; G05B 2219/31076

USPC ........................................................ 700/246
See application file for complete search history.

(56) References Cited

U.S. PATENT DOCUMENTS

| | | | |
|---|---|---|---|
| 2015/0134100 A1* | 5/2015 | Iuchi | G05B 19/182 700/159 |
| 2019/0101881 A1* | 4/2019 | Shimamura | G05B 19/05 |
| 2019/0143524 A1* | 5/2019 | Takahashi | B25J 9/1682 700/264 |
| 2022/0011754 A1* | 1/2022 | Sagasaki | G05B 19/4093 |

FOREIGN PATENT DOCUMENTS

| | | |
|---|---|---|
| JP | H02-139187 A | 5/1990 |
| JP | 6067905 | 1/2017 |

* cited by examiner

*Primary Examiner* — Khoi H Tran
*Assistant Examiner* — Sarah A Tran
(74) *Attorney, Agent, or Firm* — Wenderoth, Lind & Ponack, L.L.P.

(57) ABSTRACT

To execute processing with high accuracy in terms of time and distance via a simple method. A robot controller comprises a motion command interpretation unit that interprets a motion command program describing a taught motion and a taught position of a robot and generates a motion command; a motion command execution unit that executes the motion command; a parallel call command detection unit that pre-reads the motion command program and detects a line where a parallel call command is taught; and a parallel call command execution unit that calls and executes a program designated by a parallel call command at a designated timing.

2 Claims, 13 Drawing Sheets

FIG. 3A

```
Example program:
1: Motion to position [1]
2: Motion to position [2]
3: Motion to position [3]
4: Motion to position [4]
5: Motion to position [5]
6: Motion to position [6]+CONC_CALL PROG6 (10,3,5)
7: Motion to position [7]
```

FIG. 3B

CONC_CALL command detailed information

Line number: 6
Called subprogram name (standard): PROG6

"Line-number-designated" call definition

| # Program name | Trigger position |
|---|---|
| 1. PROG6 (standard) | −5 |
| 2. PreProg3 | −4 |
| 3. PostProg1 | 1 |
| .... | |

"Position-designated" call definition

| # Program name | Relative distance(mm) | Relative time(ms) |
|---|---|---|
| 1. Prox7 | −40.0 | 0 |
| 2. Prox8 | −30.0 | −40 |
| 3. Prox9 | −20.0 | +20 |
| 4. Prox10 | −10.0 | 0 |
| .... | | |

FIG. 4A

```
Example program:
1: Motion to position [1]
2: Motion to position [2]
3: Motion to position [3]
4: Motion to position [4]
5: Motion to position [5]
6: Motion to position [6]+CONC_CALL GUN_ON (10,3,5)
7: Motion to position [7]
```

FIG. 4B

CONC_CALL Detail Information

Line: 6
Default Program: GUN_ON

Pre Calls

| # Prog name | Trigger Point |
|---|---|
| 1. Dandori | −4 |

FIG. 4C

PROGRAMMING EXAMPLE: (Inside the Dandori program)

```
dist1=(Result of calculation on the basis of designated air pressure)
tim1=(Result of calculation on the basis of designated air pressure)
dist2=(Result of calculation on the basis of designated electrostatic
voltage value)
tim2=(Result of calculation on the basis of designated electrostatic
voltage value)
dist3=(Result of calculation on the basis of designated paint
material flow rate value)
tim3=(Result of calculation on the basis of designated paint material
flow rate value)

DefineProxCall(dist1, tim1, Air Open)
DefineProxCall(dist2, tim2, Apply Static)
DefineProxCall(dist3, tim3, Trigger ON)
```

FIG. 5

```
Example program:
1: Motion to position [1]
2: Motion to position [1]
3: Logic processings
4: Logic processings
5: Motion to position [3]
6: Logic processings
7: Motion to position [4]
8: End
```

```
Example program:
1:Motion to position [1]
2:Motion to position [2]
3:Motion to position [3]
4:Motion to position [4]
5:Motion to position [51]
6:DOUT[compressed air]=ON
7:Motion to position [52]
8:DOUT[electrostatic]=ON
9:Motion to position [6]
10:DOUT[gun]=ON
11:Motion to position [7]
```

ROBOT CONTROLLER AND ROBOT CONTROL METHOD

This application is based on and claims the benefit of priority from Japanese Patent Application No. 2019-209375, filed on 20 Nov. 2019, the content of which is incorporated herein by reference.

BACKGROUND OF THE INVENTION

Field of the Invention

The present invention relates to a robot controller and a robot control method. Related Art When a robot is in use, processes are executed with I/O signals being exchanged with peripheral equipment, such as a tool or welder, held by an end of a manipulator. Thus, both motion commands for moving the manipulator and logic commands for calculations and communicating with the peripheral equipment are present in the program of the robot.

In current controllers, when motion commands for the manipulator and logic processing commands (or subroutine calls) for output/input and calculations are both present in the program of the robot, a method of sequentially executing the commands is used.

FIG. 5 shows an example of a program used to execute commands sequentially. As shown in FIG. 5, each line of the program can be designated as a single motion command or a single logic processing command, and when the controller executes the program, the commands are executed sequentially, with the execution of one command line having to be completed before the next line is executed.

Regarding this, a technology (for example, Japanese Patent No. 6067905) is known that, via a cloud terminal connected to a Web server, creates a script of operation information for synchronizing an image displayed on a display of a touch panel of a robot, text output using speech synthesis via a speaker, and an operation setting of a predetermined part of the robot and operating the robot sequentially.

Patent Document 1: Japanese Patent No. 6067905

SUMMARY OF THE INVENTION

Depending on the application in which the robot is used, the processing of logic commands may take time. If the instructions are executed sequentially, the processing may not be completed in time. In other words, in the case in which a motion command must finish being executed before the next logic command line is executed, if too much time is spent on the logic command, processing by the peripheral equipment may be performed after the manipulator has passed the position (or time) where the original processing should be performed. This may negatively affect the quality of the processing result.

Also, by executing logic commands at each moment during the acceleration/deceleration of a manipulator, logic commands can be executed while keeping the motion speed of the manipulator substantially constant. However, if the execution of a logic command takes too long, the start of the execution of the next motion command is delayed. This may cause a risk that the motion speed cannot be kept constant.

Furthermore, depending on the application, detailed processing need to be performed in several number of split steps while the robot is moving in a forward or backward vicinity of a taught position where a certain processing is performed.

In this case, executing robot motion and logic commands sequentially may result in the robot not working as intended.

For example, for a painting task performed by a robot holding a paint spray gun, from just before (approximately 1 second or less before) when a manipulator arrives at a position where spraying starts, (1) start discharge of compressed air that atomizes the paint material, (2) start applying voltage for electrostatically charging the paint material, (3) open the valve for discharging the paint material, and other processes must be executed sequentially with accuracy in the order of milliseconds. These processes must also be executed in parallel with motion of the robot. It is difficult for a user program to execute such processes in parallel with manipulator motion.

FIG. 6A shows an example of a program for executing a spraying task. FIG. 6B shows an example of additional taught points needed to execute a spraying start sequence. As shown by the examples of FIGS. 6A and 6B, in the case in which teaching of taught points P[51] and P[52], which are not originally necessary, have to be added just for the purpose of executing the spraying start sequence, problems in terms of time accuracy and distance accuracy tend to occur.

Thus, there is a demand for a robot controller and a robot control method that provide a simple method to be able to execute application processings with high accuracy in terms of time and distance.

An embodiment of the present disclosure is a robot controller, including:
a motion command interpretation unit that interprets a motion command program describing a taught motion and a taught position of a robot and generates a motion command;
a motion command execution unit that executes the motion command;
a parallel call command detection unit that pre-reads the motion command program and detects a line where a parallel call command is taught; and
a parallel call command execution unit that calls and executes a program designated by a parallel call command at a designated timing.

According to this embodiment, processing with high accuracy in terms of time and distance can be performed via a simple method.

BRIEF DESCRIPTION OF THE DRAWINGS

FIG. 3A is an example of a motion command program used by a robot controller of an embodiment;

FIG. 3B is an example of a screen displaying detailed information of a call command used by a robot controller of an embodiment;

FIG. 4A is an example of a motion command program used by a robot controller of an embodiment;

FIG. 4B is an example of a screen displaying detailed information of a call command used by a robot controller of an embodiment. FIG. 4C is a diagram showing an example of a program executed by a robot controller of an embodiment;

FIG. 5 is an example of a motion command program used by a known robot controller;

DETAILED DESCRIPTION OF THE INVENTION

An embodiment of the present invention will be described below with reference to FIGS. 1A to 4H.

1. Embodiment Configuration

Figure 1A:
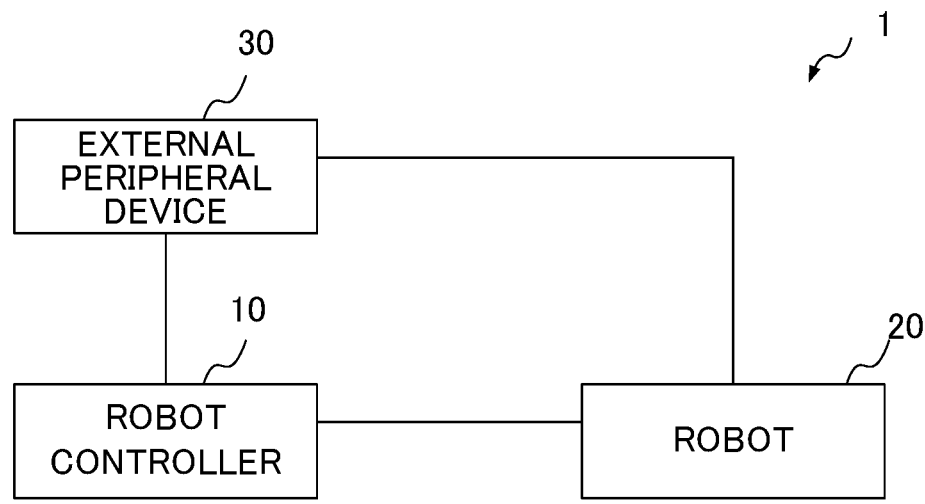
FIG. 1A is an overall configuration diagram of a robot control system of an embodiment.

FIG. 1A shows the overall configuration of a robot control system 1 according to an embodiment of the present invention. The robot control system 1 is provided with a robot controller 10, a robot 20, and an external peripheral device 30. Also, the robot controller 10 and the robot 20 are communicatively connected and the robot controller 10 and the external peripheral device 30 are communicatively connected. Note that, though not shown in FIG. 1A, the robot controller 10, the robot 20, and the external peripheral device 30 may be communicatively connected via a network.

The robot controller 10 is a device that controls the robot 20. Specifically, the robot controller 10 stores a taught program, taught data, and an motion parameter for motion control and processing control of the robot 20 and controls the robot 20 by executing the taught program on the basis of the taught data and the motion parameter.

The robot 20, for example, is an articulated robot, such as a 6-axis articulated or 4-axis articulated robot. However, no such limitation is intended, and the robot 20 may be a cartesian coordinate robot, a scalar robot, a parallel link robot, or the like.

The external peripheral device 30 is a programmable logic controller (PLC), a laser oscillator, or a similar application controller.

In the robot control system 1 shown in FIG. 1A, for example, in the case in which the external peripheral device 30 is a controller of a laser oscillator, the robot controller 10 controls the robot 20 via I/O signals and serial communication with the robot 20 and the external peripheral device 30 and controls the laser processing process performed by the robot 20.

Figure 1B:
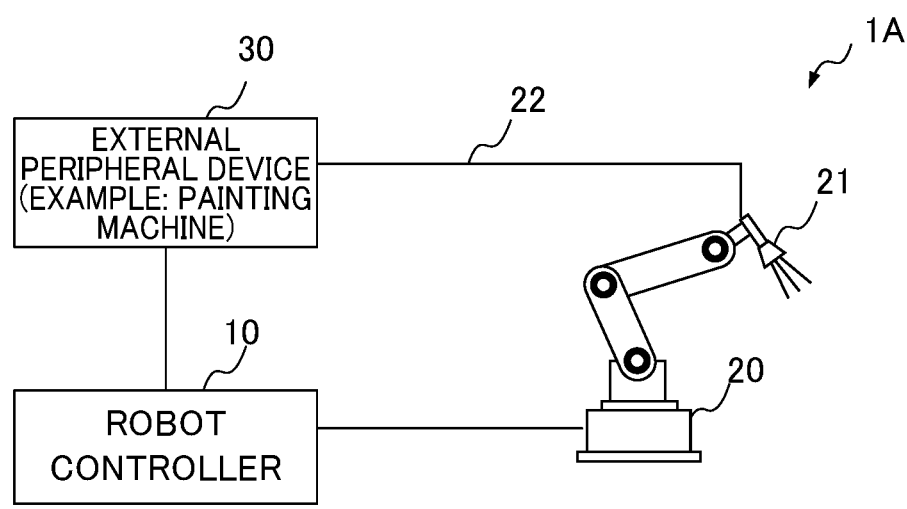
FIG. 1B is an overall configuration diagram of an example of a robot control system of an embodiment.

FIG. 1B is an overall configuration diagram of an example of the robot control system 1 in which the robot 20 performs a painting task together with the external peripheral device 30, which is in this example a painting machine. The robot 20 is provided with a spray nozzle 21, and the painting task is performed by supplying paint material from the external peripheral device 30, i.e., a painting machine, to the spray nozzle 21 via a paint material supply hose 22 and controlling the spray nozzle 21 via a manipulator provided on the robot 20. In the description below, the example of the robot 20 performing a painting task as shown in FIG. 1B will be used as necessary.

Figure 2:
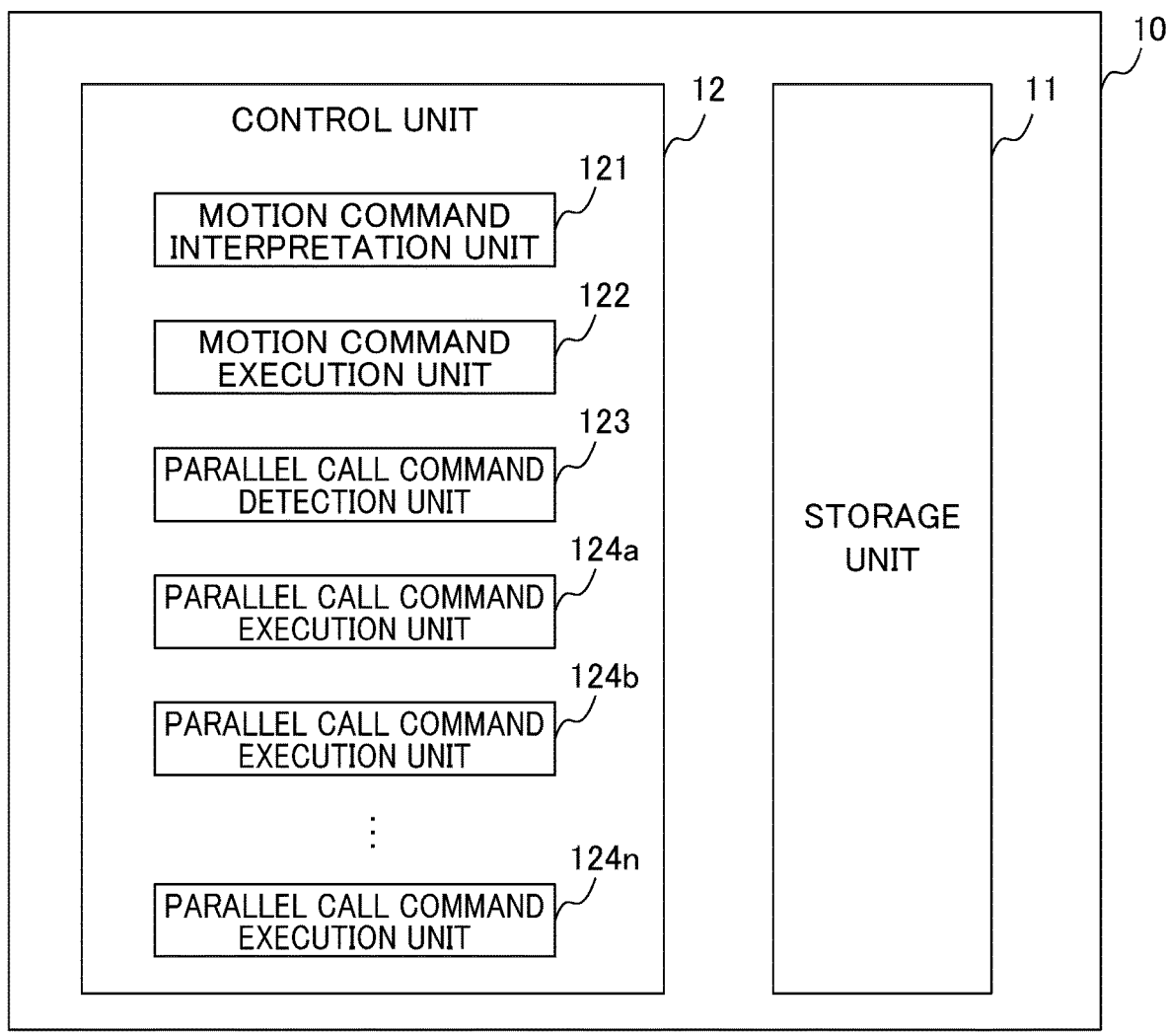
FIG. 2 is a function block diagram of a robot controller of an embodiment.

FIG. 2 is a function block diagram of the robot controller 10. The robot controller 10 is provided with a storage unit 11 and a control unit 12.

The storage unit 11 stores a motion command program describing a taught motion and a taught position of the robot 20. Also, a parallel call command called in parallel with a motion command is written in the motion command program. The parallel call command, by itself or in addition to a motion command, enables a subprogram to be called. Also, in a "parallel call" in the present invention, a subprogram is executed separate to and in parallel with the original program execution context. Note that an example of a motion command program will be described below.

The control unit 12 includes a CPU, ROM, RAM, CMOS memory, and the like, with these components being configured to be able to communicate with one another via a bus. A configuration known by one skilled in the art may be used.

The CPU is a processor that controls the robot controller 10 as a whole. As shown in FIG. 2, the control unit 12 is configured to realize the functions of a motion command interpretation unit 121, a motion command execution unit 122, a parallel call command detection unit 123, and a parallel call command execution unit 124 by the CPU reading out, via the bus, a system program and an application program stored in the ROM and controlling the robot controller 10 as a whole according to the system program and the application program.

The motion command interpretation unit 121, as described above, interprets the motion command program describing a taught motion and a taught position of the robot 20 and generates a motion command.

The motion command execution unit 122, when a taught program is started, activates task processing by the motion command interpretation unit 121 and executes the motion command generated by the motion command interpretation unit 121.

The parallel call command detection unit 123 pre-reads the motion command program and detects a line where the parallel call command is taught.

The parallel call command execution unit 124 (parallel call command execution unit 124a, parallel call command execution unit 124b, . . . , parallel call command execution unit 124n) activates task processing by the parallel call command detection unit 123 and calls and executes the program designated by the parallel call command at the designated timing. Note that the program designated by the parallel call command is capable of being executed in parallel. To enable this, the parallel call command execution unit 124 includes a plurality of parallel call command execution units 124, parallel call command execution unit 124a, parallel call command execution unit 124b, . . . , and parallel call command execution unit 124n.

The parallel call command execution unit 124 may designate how many lines before or after the line where the parallel call command is taught in the motion command program and may execute a calling method to invoke a call when the program execution reaches that line (hereinafter, also referred to as a "line-number-designated call"). Note that for one parallel call command, a call can be designated a plurality of times by a "line-number-designated". Also, when designating a line number, it is possible to select whether to consider all of the program statement or whether to consider only manipulator motion commands. Typically, since a motion of the manipulator takes some time, the "line-number-designated call" can be used to use this time for the setup of the process when there is a "position-designated call", which is described below.

Alternatively, the parallel call command execution unit 124 may invoke a call, in the motion command program, at a timing designated by a position or time of the manipulator included in the robot 20 or by both position and time, using the taught position of the line where the parallel call command is taught as a reference (hereinafter, also referred to as a "position-designated call"). Note that for one parallel call command, a call can be designated a plurality of times by a "position-designated". In executing the application of the robot 20, many processes must be executed with high accuracy, accurate within milliseconds. These calls can be used to execute such processes.

FIG. 3A shows an example of a motion command program in which a parallel call command is written. In the motion command program shown in FIG. 3A, a parallel call command "CONC_CALL PROG6(10,3,5) is added to the motion command in the 6th line. Here, "CONC_CALL" (concurrent call) is a parallel call command for calling a program named "PROG6". Also, "(10,3,5)" is an example of an argument passed to "PROG6".

The parallel call command detection unit 123 pre-reads the motion command program shown in FIG. 3A and detects line number 6 where the parallel call command is taught.

FIG. 3B shows an example of a screen displaying detailed information of the "CONC_CALL" shown in FIG. 3A and shows detailed information that is displayed when the program shown in FIG. 3A is displayed and, for example, the "ENTER" key is pressed with the cursor above the "CONC_CALL" command. Note that for the data shown in FIG. 3B, internally, the detailed information may be attached to the "CONC_CALL" command, allocated to a data area, and stored as information; or stored in the robot controller 10 as a data file such as an XML file.

In the "CONC_CALL command detailed information" row of FIG. 3B, in line number 6, the "CONC_CALL" command with the cursor above the command refers to a command for calling the program "PROG6".

Also, the ""line-number-designated" call definition" row is a call list in which the calling method is line-number-designated.

"Program name" is the name of the program called, and if nothing is designated, "standard" is displayed and the program set in advance by the "CONC_CALL" command is called. Also, a different program can be designated, and in this case, the designated program is called at the timing designated by the designated program. Note that if an argument is designated, the argument is passed to the subprogram.

"Trigger position" is a designation of what taught point, i.e., how many taught points before or after the position where the command is taught, needs to be reached for the program indicated in the "Program name" to be called. In the example shown in FIG. 3B, the "Trigger position" of "PROG6" is "−5". Referring to the example program shown in FIG. 3A, this designation means that "PROG6" is called at position [1], which is 5 points before position [6] where the motion command to which "CONC_CALL PROG6(10, 3,5)" is attached is taught.

Also, the ""position-designated" call definition" row is a call list in which the calling method is position-designated.

"Relative distance (mm)" designates what relative position, forward or backward, from the position where the "CONC_CALL" command is taught the robot manipulator needs to approach for the program designated by the "Program name" to be called. A negative value indicates before the taught point, and a positive value indicates after the taught point. The unit is "mm". Note that in the case in which the manipulator does not pass over the taught point due to a rounded corner, the relative distance is defined as the distance from the point of closest approach of the manipulator.

"Relative time (ms)" is designated as the offset in time forward or backward from the trigger position designated in "relative distance (mm)". For example, in the case in which "−10" is designated, the "position-designated" call is invoked 10 msec before when the position is reached where the original "position-designated" would be called. A negative value indicates before, and a positive value indicates after.

The parallel call command execution unit 124 calls and executes the "PROG6" program designated by the "CONC_CALL" parallel call command at position [1] as designated by the "Trigger position" of "−5", i.e., at a line number 5 before the position [6] designated by line number 6.

Note that the same program may be called any number of times at different timings. Thus, a function is prepared for discerning by what calling method and at what timing it is called in the called program. By the value from the function, the program can discern whether it is called by the "line-number-designated" or the "position-designated" and can discern what line number it is called by in the case of "line-number-designated" and what position it is in in the case of "position-designated". This allows processing appropriate to the current state to be executed.

Also, a method of sharing data between a series of programs called by a single "CONC_CALL" is provided. For example, data setup in advance in a program called by a line-number-designated call can be referenced by a program called thereafter by a position-designated call. For example, an operation is enabled in which when setup is performed in response to a line-number-designated call, a value of an analog voltage is calculated in advance and the calculated result is temporarily stored in a shared area, then, within a position-designated call that occurs where the manipulator reaches a vicinity of a taught position region, the calculated result stored in the shared area is used to quickly (without again calculating an output voltage value) set an analog output.

Figure 3C:
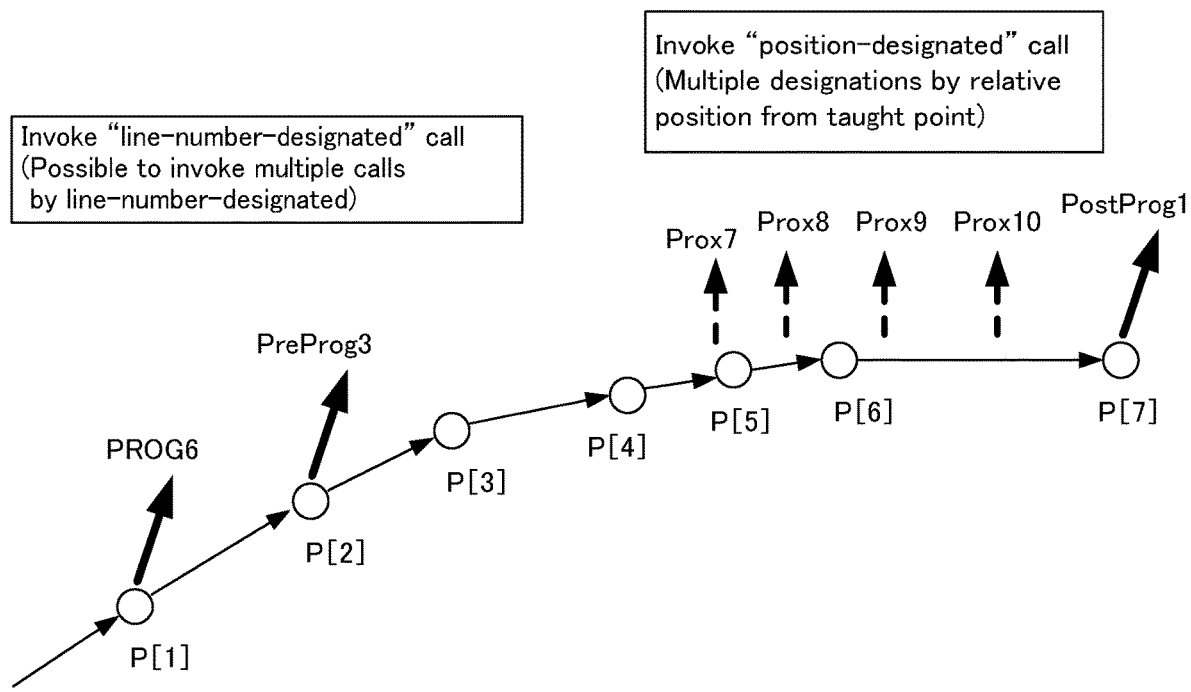
FIG. 3C is a diagram showing an example of the relationship between taught points, designated by a robot controller of an embodiment, and invoke positions of "line-number-designated" calls and "position-designated" calls.

FIG. 3C is a diagram showing an example of the relationship between the taught points and the invoke positions of the line-number-designated calls and the position-designated calls. The solid line arrows indicate the call positions of a program when the program is called by a line-number-designated call. In the case in which programs are called by a line-number-designated call, the call positions of the programs correspond to the line numbers where the motion commands are written. Thus, the programs are called at the taught points. In the example shown in FIG. 3C, programs are called at P[1], P[2], and P[7].

Specifically, using the example of detailed information shown in FIG. 3B, in the case in which the program named "CONC_CALL" of line number 6 is "PROG6", the "Trigger position" is "−5". Thus, the parallel call command execution unit 124 executes "PROG6" at position [1] (P[1]) designated by line number 1, which is "−5" from line number 6. In a similar manner, in the case in which the program named "CONC_CALL" of line number 6 is "PreProg3", the "Trigger position" is "−4". Thus, the parallel call command execution unit 124 executes "PreProg3" at position [2] (P[2]) designated by line number 2, which is "−4" from position 6 designated by line number 6. Also in a similar manner, in the case in which the program named "CONC_CALL" of line number 6 is "PostProg1", the "Trigger position" is "1". Thus, the parallel call command execution unit 124 executes "PostProg1" at position [7] (P[7]) designated by line number 7, which is "1" from line number 6. Note that these "CONC_CALL" can be written on a line having a discretionary line number, and the parallel call command execution unit 124 executes "PROG6" at a position designated by the line number "−5" from the discretionary line number. In a similar manner, the parallel call command execution unit 124 executes "PreProg3" at a position designated by the line number "−4" from the discretionary line number. In a similar manner, the parallel call command execution unit 124 executes "PostProg1" at a position designated by the line number "1" from the discretionary line number.

The broken line arrows indicate the call positions of a program when the program is called by a position-designated. In the case in which programs are called by a position-designated, the called positions of the programs correspond to positions forward or backward from a taught point where a motion command is taught. In the example shown in FIG. 3C, programs are called forward and backward from P[6].

Specifically, using the example of detailed information shown in FIG. 3B, in the case in which the program named "CONC_CALL" of line number 6 is "Prox7", the "Relative distance (mm)" is "−40.0" and the "Relative time (ms)" is "0". Thus, the parallel call command execution unit 124 executes "Prox7" at a position −40.0 (mm) from position [6], which is a position designated by line number 6. In a similar manner, in the case in which the program named "CONC_CALL" of line number 6 is "Prox8", the "Relative distance (mm)" is "−30.0" and the "Relative time (ms)" is "−40". Thus, the parallel call command execution unit 124 executes "Prox8" at a time −40 (ms) from the time when the manipulator arrives at a position −30.0 mm from position [6], which is a position designated by line number 6. In a similar manner, in the case in which the program named "CONC_CALL" of line number 6 is "Prox9", the "Relative distance (mm)" is "−20.0" and the "Relative time (ms)" is "+20". Thus, "Prox9" is executed at a time+20 (ms) from the time when the manipulator arrives at a position −20.0 mm from position [6], which is a position designated by line number 6. In a similar manner, in the case in which the program named "CONC_CALL" of line number 6 is "Prox10", the "Relative distance (mm)" is "−10.0" and the "Relative time (ms)" is "0". Thus, the parallel call command execution unit 124 executes "Prox10" at a position −10.0 (mm) from position [6], which is a position designated by line number 6. Note that these "CONC_CALL" can be written on a line having a discretionary line number, and the parallel call command execution unit 124 executes "Prox7" at a position −40.0 (mm) from a taught position designated by the discretionary line number. In a similar manner, the parallel call command execution unit 124 executes "Prox8" at a time −40 (ms) from the time the manipulator arrives at a position −30.0 (mm) from a taught position designated by the discretionary line number. In a similar manner, the parallel call command execution unit 124 executes "Prox9" at a time+20 (ms) from the time the manipulator arrives at a position −20.0 (mm) from a position designated by the discretionary line number. In a similar manner, the parallel call command execution unit 124 executes "Prox10" at a position −10.0 (mm) from a position designated by the discretionary line number.

Also, in the case in which it is desired to give priority to the execution timing of a parallel call command, the parallel call command execution unit 124 may execute the parallel call command as a separate task to the motion command. In the case in which it is desired to give priority to the execution order, the parallel call command execution unit 124 may execute the parallel call command in the same task as the motion command.

Also, to enable a line-number-designated call and a position-designated call to be executed in parallel with the program processing of the robot 20, a plurality of tasks (internal execution processing subject managed by the operating system of the robot 20) executed by the execution processing of the program need to be invoked. For example, 3 tasks, a task for executing the program body of the robot 20, a task for executing a line-number-designated call, and a task for executing a position-designated call, may be run in parallel. In this case, when the next line-number-designated call is invoked during the execution of a line-number-designated call, the later line-number-designated call is made to wait until the former call is finished. This also applies to position-designated calls.

When a plurality of processes are executed in parallel at the same time in this manner, it is important to be able to give priority to executions. Typically, often line-number-designated calls can be executed allowing for time to be spent on "setup" from a few rows before, and can therefore be executed with low priority. However, position-designated calls need application processing to be executed with high accuracy in sync with the motion of the robot. Thus, position-designated calls need to be executed with a high priority. Accordingly, a priority order with the execution unit (task) of a line-number-designated call at a low priority, the task for executing a position-designated call at a high priority, and a task for executing the program body at a priority therebetween is typically designated in advance.

Also, implementation of a system in which a task for executing a parallel call is internally and dynamically created each time a line-number-designated or a position-designated call is invoked may be considered. In this case, for example, if a position-designated call is being executed, processing such as starting execution of the next position-designated call without waiting for the first to finish is possible, and in this case, each position-designated call is designated with a priority which is used to execute processing in order from high priority when a plurality of execution processes are invoked at the same time.

Furthermore, to find a call command a few lines ahead during the program execution of the robot 20 and executing in advance a line-number-designated call requires the program to be pre-read and program commands scheduled for execution to be read in advance during the execution of the program (in particular, during the execution of a motion command). Thus, during motion processing of the robot 20, the program execution unit (the motion command execution unit 122, the parallel call command execution unit 124) are on standby, and the spare time here is used for pre-reading processing of the program.

2. Effects of the Embodiment

In the robot controller 10 according to the present embodiment, a subprogram can be executed separate to and parallel with the original program execution context.

Also, in the robot controller 10 according to the present embodiment, for example, when a user teaches a logic command for controlling a processing process for laser welding or the like, a logic command can be executed independent to the motion command (taught position) of the robot 20 at a discretionary position and/or timing.

Furthermore, in the robot controller 10 according to the present embodiment, the number of taught points of the robot 20 can be minimized. Thus, the motion planning processing of the robot 20 can be lightened and the original performance of the robot 20 can be achieved.

3. Examples

An Example in which the robot 20 performs a paint spraying task will be described. When the robot 20 performs a spraying task, the processing described below needs to be executed with high accuracy in order and in parallel with the motion of the robot 20 at or near the spraying start position.

1. Start discharge of compressed air that atomizes the paint material (corresponding to the program "Air Open" described below).
2. Start applying voltage for electrostatically charging the paint material (corresponding to the program "Apply Static" described below).
3. Open the value for discharging the paint material (corresponding to the program "Trigger ON" described below).

FIG. 4A shows an example of a program of the Example. In the example program shown in FIG. 4A, a parallel call command "CONC_CALL GUN_ON (10,3,5) is attached to the motion command in the 6th line. Here, "CONC_CALL" (concurrent call) is a parallel call command for calling a program named "GUN_ON". Also, "(10,3,5)" is an example of an argument passed to "GUN_ON". "GUN_ON" is a program for activating painting with paint, and the arguments "10,3,5" correspond to "paint material flow rate", "air pressure", and "electrostatic voltage".

FIG. 4B shows an example of a screen displaying detailed information of the "CONC_CALL" shown in FIG. 4A and shows detailed information that is displayed when the program shown in FIG. 4A is being entered and the "ENTER" key is pressed with the cursor above the "CONC_CALL" command.

In the present Example, position-designated call needs to be executed such that, in a vicinity of the taught position, a position-designated call is invoked three times and the processing sequence of "start blowing air", "apply electrostatic voltage", and "start paint material spraying" is executed.

Air delay time changes depending on the applied air pressure. Thus, a fixed value cannot be designated in advance to the distance and time of the position-designated call. Instead, the program executed when "GUN_ON" is executed is the "Dandori" program indicated in the "Pre Calls" field. The distance and time of a position-designated call can be dynamically set via the "Dandori" program.

In the example shown in FIGS. 4A and 4B, the parallel call command detection unit 123 pre-reads the motion command program shown in FIG. 4A and detects line number 6 where the parallel call command is taught.

In executing the "GUN_ON(10,3,5)" program with the "CONC_CALL" parallel call command designated, the parallel call command execution unit 124, invokes a line-number-designated call at position [2] (P[2]) designated by line number 2, i.e., as designated by the "Trigger position" of "−4", and the "Dandori" program is called. In the "Dandori" program, when three position-designated calls are invoked for the "Air Open" program, the "Apply Static" program, and the "Trigger ON" program is defined.

FIG. 4C shows an example of the inside of the "Dandori" program. The "Dandori" program calculates a delay time until air is blown on the basis of a designated air pressure value and calculates a timing (distance and time) to call the "Air Open" program for setting the analog output on the basis of the designated air pressure value. On the basis of this result, a position-designated call of the "Air Open" program is defined.

By a similar calculation, the timing (distance and time) to call, by position-designated, the "Apply Static" program for applying electrostatic voltage and the "Trigger ON" program for starting spraying is calculated, and the position-designated call of the "Apply Static" program and the "Trigger ON" program are defined.

Note that a "Define Prox Call" function in FIG. 4C is defined as follows. Specifically, in the function "Define Prox Call (d,t,p)", the d is a relative position (positive or negative value) indicating the call timing of the designated program, t is a time offset (positive or negative value) for adjusting the call timing of the designated program, and p is the called program name.

Figure 4D:
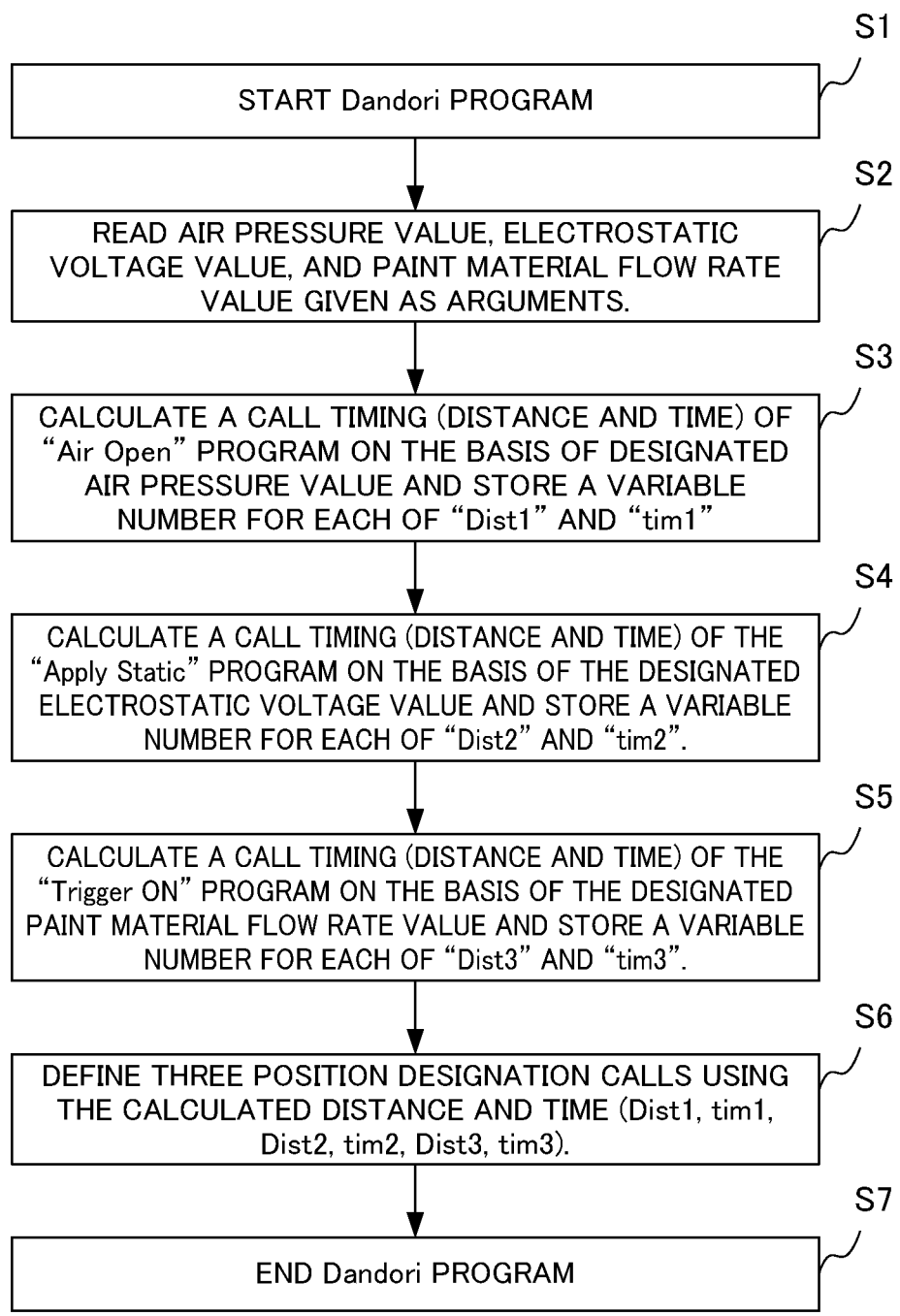
FIG. 4D is a flowchart showing processing by a program executed by a robot controller of an embodiment.

FIG. 4D is a flowchart showing processes executed by the "Dandori" program.

In Step S1, the "Dandori" program is started.

In Step S2, the air pressure value, the electrostatic voltage value, and the paint material flow rate value given as arguments are read.

In Step S3, a call timing (distance and time) of the "Air Open" program is calculated on the basis of the designated air pressure value and a variable number for each of "Dist1" and "tim1" is stored.

In Step S4, a call timing (distance and time) of the "Apply Static" program is calculated on the basis of the designated electrostatic voltage value and a variable number for each of "Dist2" and "tim2" is stored.

In Step S5, a call timing (distance and time) of the "Trigger ON" program is calculated on the basis of the designated electrostatic voltage value and a variable number for each of "Dist3" and "tim3" is stored.

In Step S6, three position-designated calls are defined using the calculated distance and time (Dist1, tim1, Dist2, tim2, Dist3, tim3).

In Step S7, the "Dandori" program ends.

Figure 4E:
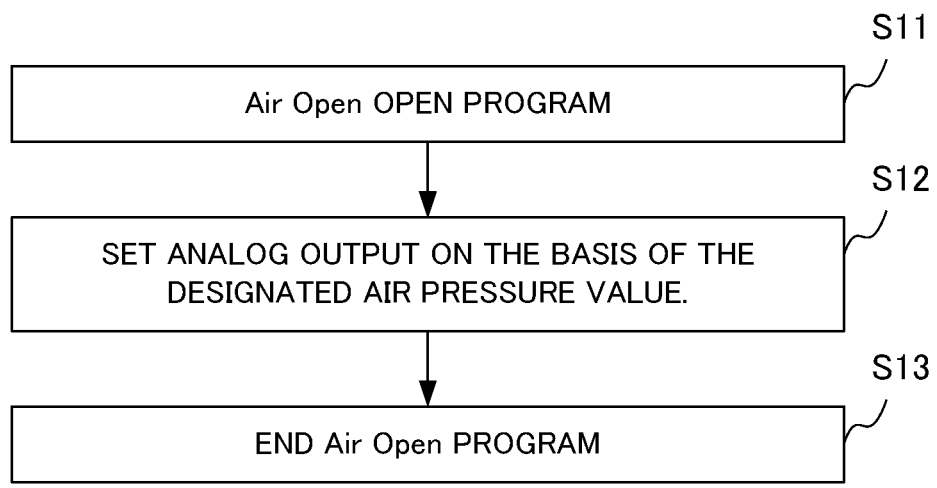
FIG. 4E is a flowchart showing processing by a program executed by a robot controller of an embodiment.

FIG. 4E is a flowchart showing processes executed by the "Air Open" program.

In Step S11, the "Air Open" program starts.

In Step S12, the analog output is set on the basis of the designated air pressure value.

In Step S13, the "Air Open" program ends.

Figure 4F:
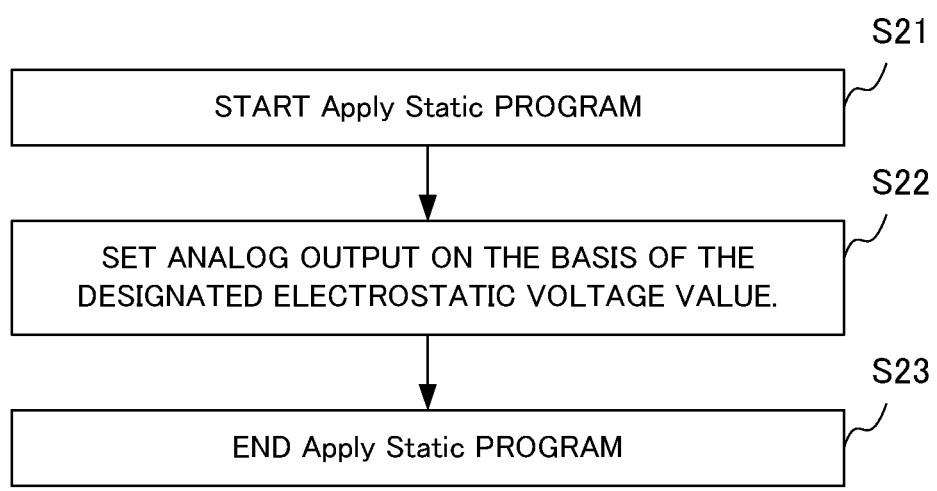
FIG. 4F is a flowchart showing processing by a program executed by a robot controller of an embodiment.

FIG. 4F is a flowchart showing processes executed by the "Apply Static" program.

In Step S21, the "Apply Static" program starts.

In Step S22, the analog output is set on the basis of the designated electrostatic voltage value.

In Step S23, the "Apply Static" program ends.

Figure 4G:
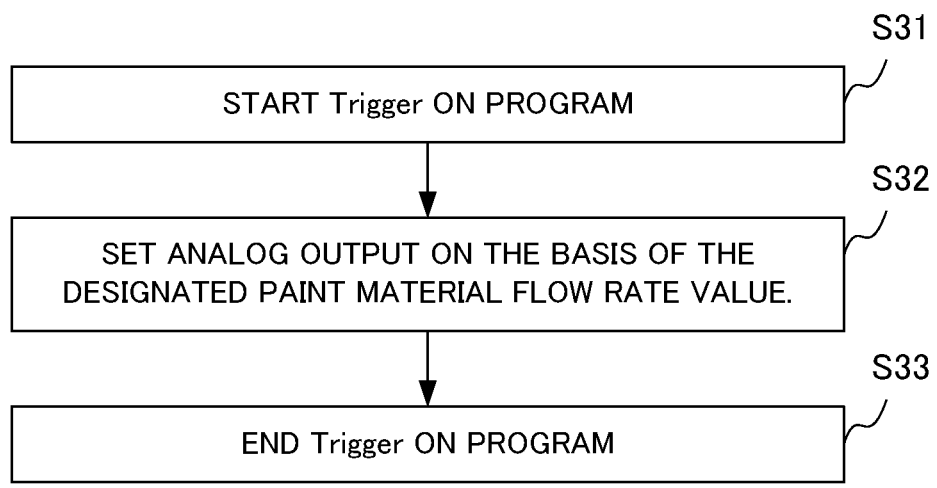
FIG. 4G is a flowchart showing processing by a program executed by a robot controller of an embodiment.

FIG. 4G is a flowchart showing processes executed by the "Trigger ON" program.

In Step S31, the "Trigger ON" program starts.

In Step S32, the analog output is set on the basis of the designated paint material flow rate value.

In Step S33, the "Trigger ON" program ends.

Figure 4H:
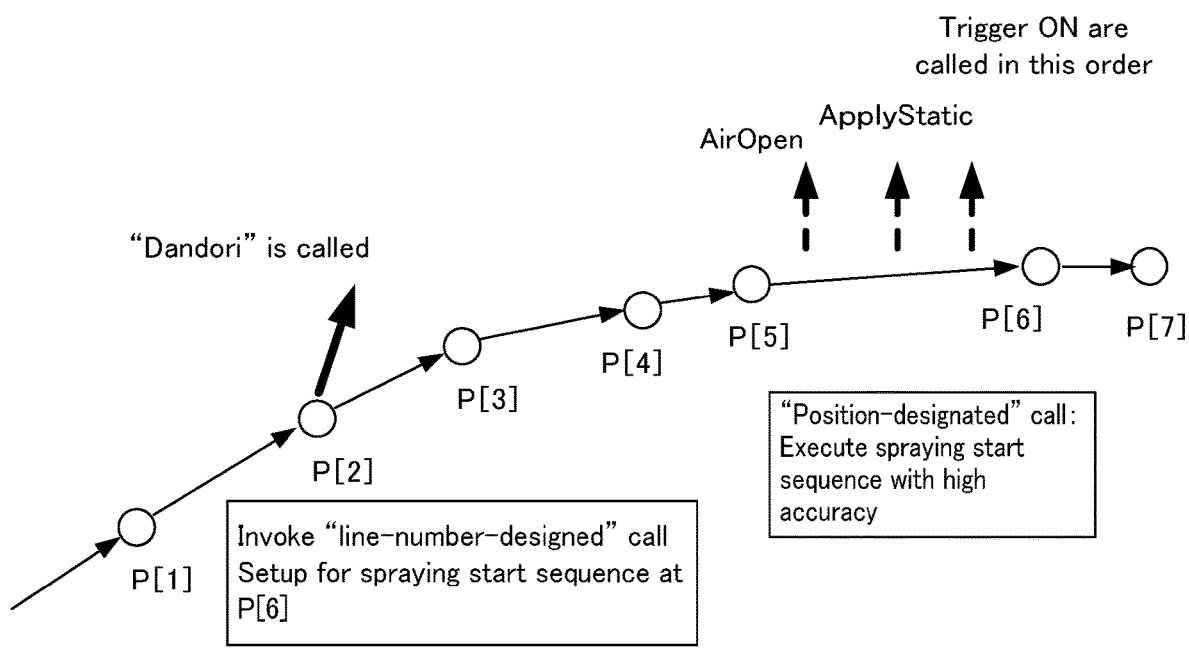
FIG. 4H is a diagram showing an example of the relationship between taught points, designated by a robot controller of an embodiment, and invoke positions of "line-number-designated" calls and "position-designated" calls.
Figures 6A, 6B:
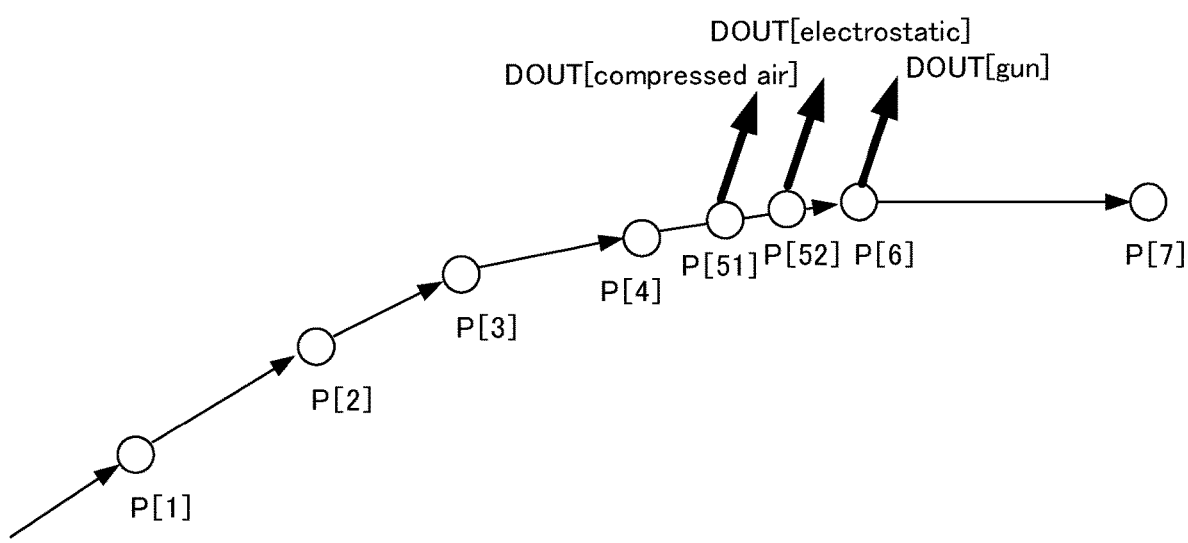
FIG. 6A is an example of a motion command program used by a known robot controller.
FIG. 6B is a diagram showing an example of the relationship between taught points, designated by a known robot controller, and invoke positions of "line-number-designated" calls and "position-designated" calls.

FIG. 4H is a diagram showing the relationship between the taught points and the invoke positions of the line-number-designated calls and the position-designated calls according to the present Example. In the example shown in FIG. 4H, the "Dandori" program is called at P[2] by a line-number-designated call to setup for the spraying start sequence at P[6]. Also, between P[5] and P[6], the "Air Open" program, the "Apply Static" program, and the "Trigger ON" program are called in this order by position-designated calls.

(1) A robot controller (for example, the "robot controller 10" described above) according to an embodiment of the present invention includes: a motion command interpretation unit (for example, the "motion command interpretation unit 121" described above) that interprets a motion command program describing a taught motion and a taught position of a robot and generates a motion command; a motion command execution unit (for example, the "motion command execution unit 122" described above) that executes the motion command; a parallel call command detection unit (for example, the "parallel call command detection unit 123" described above) that pre-reads the motion command program and detects a line where a parallel call command is taught; and a parallel call command execution unit (for example, the "parallel call command execution unit 124" described above) that calls and executes a program designated by a parallel call command at a designated timing.

With this configuration, processing with high accuracy in terms of time and distance can be performed via a simple method.

(2) In the robot controller (for example, the "robot controller 10" described above) according to (1), the parallel call command execution unit (for example, the "parallel call command execution unit 124" described above) designates a line number forward or backward, in the motion command program, from the line where the parallel call command is taught and executes the parallel call command in parallel with executing the motion command when execution of the motion command reaches the line number forward or backward.

With this configuration, processing invoked by a position-designated call can be setup for using the time taken by a motion of a manipulator, for example.

(3) In the robot controller (for example, the "robot controller 10" described above) according to (1), the parallel call command execution unit (for example, the "parallel call command execution unit 124" described above) executes the parallel call command in parallel with executing the motion command at a timing designated by a position and/or time of a manipulator included in the robot using a taught position, from the motion command, of the line where the parallel call command is taught, in the motion command program, as a reference.

With this configuration, in executing an application of the robot, processing with high accuracy, accurate within milliseconds, can be easily executed.

EXPLANATION OF REFERENCE NUMERALS

1 Robot control system
10 Robot controller
11 Storage unit
12 Control unit
20 Robot
30 External peripheral device
121 Motion command interpretation unit
122 Motion command execution unit
123 Parallel call command detection unit
124 Parallel call command execution unit

What is claimed is:
1. A robot controller, comprising:
a motion command interpretation unit that interprets a motion command program describing a taught motion and a taught position of a robot and generates a motion command;
a motion command execution unit that executes the motion command;
a parallel call command detection unit that pre-reads the motion command program and detects a line where a parallel call command that is written in addition to the motion command is taught; and
a parallel call command execution unit that calls and executes a program designated by the parallel call command separate to and concurrently with the motion command program at a designated timing by the parallel call command, wherein
the parallel call command execution unit designates a line number forward or backward, in the motion command program, from the line where the parallel call command is taught, and executes the parallel call command in parallel with executing the motion command when execution of the motion command reaches the line number forward or backward.
2. The robot controller according to claim 1, wherein
the parallel call command execution unit executes the parallel call command in parallel with an execution of the motion command at a timing designated by a position and/or time of a manipulator included in the robot, using a taught position in the motion command at the line where the parallel call command is taught in the motion command program, as a reference.

* * * * *